United States Patent
Kwon et al.

(10) Patent No.: US 10,044,416 B2
(45) Date of Patent: Aug. 7, 2018

(54) MULTIPLE INPUT AND MULTIPLE OUTPUT COMMUNICATION APPARATUS AND CHANNEL SCANNING METHOD THEREOF

(75) Inventors: Chang-yeul Kwon, Seongnam-si (KR);
Jae-hwa Kim, Suwon-si (KR);
Chil-yeul Yang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1517 days.

(21) Appl. No.: 11/325,446

(22) Filed: Jan. 5, 2006

(65) Prior Publication Data
US 2006/0251025 A1    Nov. 9, 2006

(30) Foreign Application Priority Data
Jan. 31, 2005    (KR) .................. 10-2005-0008692

(51) Int. Cl.
*H04B 7/04*    (2017.01)
*H04B 7/08*    (2006.01)
(Continued)

(52) U.S. Cl.
CPC ......... *H04B 7/0413* (2013.01); *H04B 7/0686* (2013.01); *H04B 7/0868* (2013.01)

(58) Field of Classification Search
CPC ... H04L 5/0037; H04L 5/0094; H04L 5/1484; H04L 5/0023; H04L 1/00;
(Continued)

(56) References Cited

U.S. PATENT DOCUMENTS 6,400,961 B1    6/2002   Lillie et al.
7,423,989 B2 *  9/2008   Hansen ............... H04B 7/0667
                                                370/328
(Continued)

FOREIGN PATENT DOCUMENTS

EP    1-117-197 A2    7/2001
KP    10-20040007661    1/2004
(Continued)

OTHER PUBLICATIONS

Communication dated Sep. 9, 2014 issued by European Patent Office in counterpart European Patent Application No. 06250069.9.

*Primary Examiner* — Khawar Iqbal
(74) *Attorney, Agent, or Firm* — Sughrue Mion, PLLC

(57) ABSTRACT

A MIMO communication apparatus and a channel scanning method thereof that can reduce a channel scanning time are provided. The channel scanning method includes receiving an input request for channel scanning, and scanning for a plurality of channels simultaneously by independently using a plurality of antennas in accordance with the input request. The apparatus includes a control unit which designates channels for scanning; a frame generating unit which generates a search frame if the channel scanning is active scanning; and a transceiver unit which includes a plurality of antennas and which assigns the channels designated by the control unit to the plurality of antennas, transmits the search frame generated by the frame generating unit through the plurality of antennas, and receives a response frame to the transmitted search frame; wherein the transceiver unit assigns different channels to the plurality of antennas, respectively.

6 Claims, 8 Drawing Sheets

(51) Int. Cl.
*H04B 7/0413* (2017.01)
*H04B 7/06* (2006.01)

(58) Field of Classification Search
CPC ........... H04W 72/0466; H04W 52/322; H04W 36/16; H04W 72/042; H04B 7/04; H04B 7/08; H04B 7/06; H04B 7/26; H04J 11/00; H04Q 7/00
USPC ........................................ 370/338, 330, 445
See application file for complete search history.

(56) References Cited

U.S. PATENT DOCUMENTS

| | | | | |
|---|---|---|---|---|
| 7,492,749 | B2* | 2/2009 | Song | H04B 7/04 342/383 |
| 7,580,364 | B2* | 8/2009 | Hazra | H04W 24/04 370/252 |
| 8,737,530 | B2* | 5/2014 | Ponnampalam | H04B 7/02 375/299 |
| 2003/0161282 | A1 | 8/2003 | Medvedev et al. | |
| 2004/0017794 | A1* | 1/2004 | Trachewsky | H04W 48/20 370/338 |
| 2004/0100939 | A1 | 5/2004 | Kriedte et al. | |
| 2005/0003865 | A1* | 1/2005 | Lastinger et al. | 455/562.1 |
| 2005/0124340 | A1* | 6/2005 | Giesberts | H04W 48/20 455/432.1 |
| 2005/0219999 | A1* | 10/2005 | Kim | H04L 1/0003 370/207 |
| 2005/0245269 | A1* | 11/2005 | Demirhan | H04W 24/00 455/452.1 |
| 2005/0250506 | A1* | 11/2005 | Beale | H04L 5/0037 455/452.1 |
| 2005/0282553 | A1* | 12/2005 | Lastinger | H01Q 3/2605 455/450 |
| 2006/0035675 | A1* | 2/2006 | Karaoguz | H04B 7/0491 455/562.1 |
| 2006/0209874 | A1* | 9/2006 | Nagata | 370/445 |
| 2007/0286143 | A1* | 12/2007 | Olson et al. | 370/338 |
| 2008/0039107 | A1* | 2/2008 | Ma | H04B 7/02 455/450 |
| 2008/0075033 | A1* | 3/2008 | Shattil | H04B 7/026 370/328 |
| 2009/0010221 | A1* | 1/2009 | Ginzburg et al. | 370/330 |
| 2014/0247895 | A1* | 9/2014 | Shattil | H04B 7/026 375/267 |

FOREIGN PATENT DOCUMENTS

| | | |
|---|---|---|
| KP | 10-2004 0104796 A | 12/2004 |
| KR | 10-2003-0075886 A | 9/2003 |

* cited by examiner

MULTIPLE INPUT AND MULTIPLE OUTPUT COMMUNICATION APPARATUS AND CHANNEL SCANNING METHOD THEREOF

CROSS-REFERENCE TO RELATED APPLICATIONS

This application claims priority from Korean Patent Application No. 10-2005-0008692 filed on Jan. 31, 2005 in the Korean Intellectual Property Office, the disclosure of which is incorporated herein in its entirety by reference.

BACKGROUND OF THE INVENTION

1. Field of the Invention

The present invention relates to channel scanning, and more particularly, to a multiple input and multiple output (MIMO) communication apparatus and a channel scanning method thereof.

2. Description of the Prior Art

A related art wireless communication device has been developed based on audio services. However, with the increasing need for multimedia services of high quality, wireless communication devices have been recently changed to accommodate data services. In this respect, technologies for supporting high speed, high capacity wireless communication are being developed. One such technology is multiple input multiple output (MIMO).

A MIMO communication device uses an adaptive array antenna technique that electrically controls orientation using a plurality of antennas. The MIMO communication device narrows orientation in a beam shape to form a plurality of independent transmission paths. Data transmission in the MIMO communication apparatus is shown in FIG. 1.

FIG. 1 illustrates data transmission in a related art MIMO communication device.

As shown in FIG. 1, a MIMO communication device 110 processes a serial data stream in parallel, and thus splits the serial data stream into a plurality of dependent streams that are transmitted through a plurality of antennas to another MIMO communication device 120. Then, the MIMO communication device 120 decodes the dependent data streams to restore them to the original serial data stream.

Therefore, the MIMO communication device has the advantage in that its data transmission rate increases as much as the number of antennas in comparison with a conventional single input single output (SISO) communication device.

The MIMO communication device requires channel scanning to log into a specific network or to set a new network. For example, if the MIMO communication device produces an independent basic service set (IBSS) or searches for a new access point (AP) when roaming, channel scanning is first required. Particularly, channel scanning is significant for a dynamic frequency selection (DFS) technique that allows all the communication bands to use the spectrum without interference between wireless communication devices.

Such channel scanning is classified into active scanning and passive scanning. The active scanning is carried out in such a manner that the MIMO communication device transmits a frame for a channel search (hereinafter referred to as a "search frame") and receives a response frame to the search frame. The passive scanning is carried out in such a manner that each channel is on standby to receive a beacon frame, and then receives the beacon frame.

However, the related art MIMO communication device carries out sequential channel scanning for all channels in the same manner as the SISO communication apparatus. For example, in the case of active scanning, the antennas of the MIMO communication device transmit a frame for searching for one channel. In other words, for channel scanning for channels 1 to 3, the MIMO communication device carries out channel scanning for the first channel 1. At this time, the antennas of the MIMO communication device transmit the search frame for channel 1. Once channel scanning for channel 1 is finished, channel scanning for channel 2 is carried out. Likewise, once channel scanning for the channel 2 is finished, channel scanning for channel 3 is carried out.

In this way, the related art MIMO communication device having the plurality of antennas sequentially carries out scanning for all channels in the same manner as the SISO communication apparatus. However, such sequential channel scanning is inefficient.

Further, if the related art MIMO communication device is operated in the same manner as the SISO communication apparatus (for example, if the MIMO communication device transmits data destined for the SISO communication device), antennas other than the single antenna used for data transmission are idle.

In such a case, it takes much time to carry out channel scanning in the related art MIMO communication device. This may adversely affect the fast roaming or the DFS of the MIMO communication device.

SUMMARY OF THE INVENTION

Accordingly, the present invention has been made to address the above-mentioned problems occurring in the prior art, and an aspect of the present invention is to provide a MIMO communication apparatus and a channel scanning method thereof that can reduce channel scanning time.

Additional aspects of the invention will be set forth in part in the description which follows and in part will become apparent to those having ordinary skill in the art upon examination of the following or may be learned from practice of the invention.

According to an exemplary embodiment of the present invention, there is provided a channel scanning method comprising receiving an input of a request for channel scanning, and scanning for a plurality of channels simultaneously by independently using a plurality of antennas in accordance with the input request for channel scanning.

According to another exemplary embodiment of the present invention, there is provided a MIMO communication apparatus comprising a control unit which is configured to designate a channel for scanning if a request for channel scanning is input, a frame generating unit which is configured to generate a search frame if the requested channel scanning is active scanning, and a transceiver unit which includes a plurality of antennas, and which is configured to assign the channel designated by the control unit to the plurality of antennas, to transmit the search frame generated by the frame generating unit through the plurality of antennas, and to receive a response frame to the transmitted search frame, wherein the transceiver unit assigns different channels to the plurality of antennas, respectively.

BRIEF DESCRIPTION OF THE DRAWINGS

The above and other aspects of the present invention will be more apparent from the following detailed description of exemplary embodiments of the present invention taken in conjunction with the accompanying drawings, in which.

DETAILED DESCRIPTION OF EXEMPLARY EMBODIMENTS OF THE PRESENT INVENTION

Figure 1:
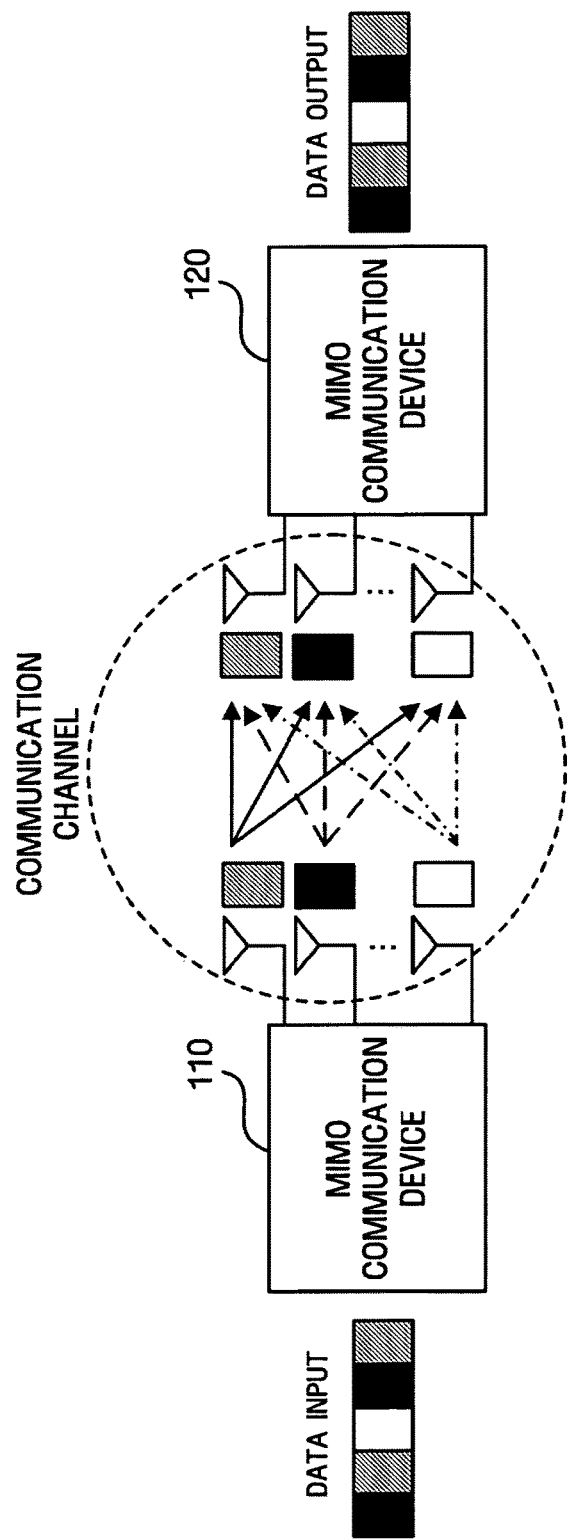
FIG. 1 is a view illustrating the data transmission state of a related art MIMO communication device.

Hereinafter, exemplary embodiments of the present invention will be described in detail with reference to the accompanying drawings. The aspects of the present invention and methods for achieving the aspects will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are merely provided to assist those of ordinary skill in the art in a comprehensive understanding of the invention, and the present invention is only defined within the scope of the appended claims. In the whole description of the present invention, the same drawing reference numerals are used for the same elements across various figures.

Figure 2:
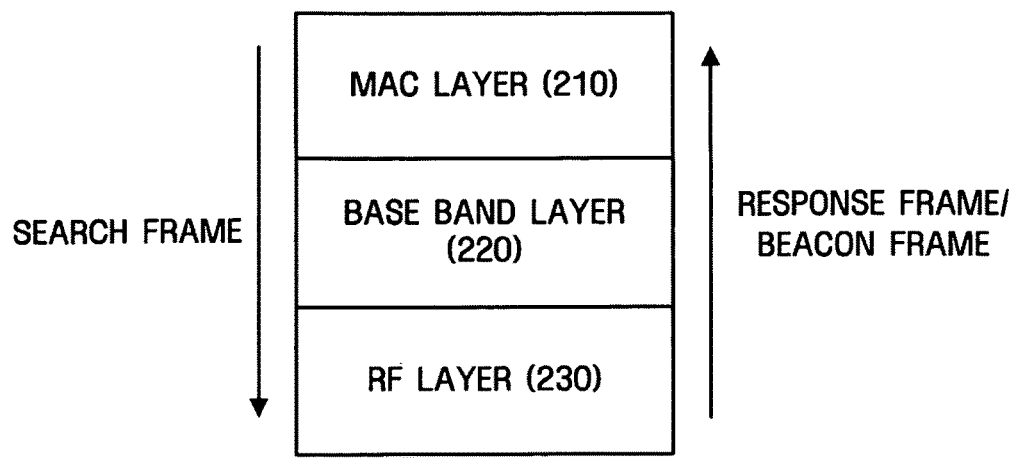
FIG. 2 is a view illustrating a part of a stack structure of a MIMO communication apparatus according to an exemplary embodiment of the present invention.

FIG. 2 illustrates a part of a stack structure of a MIMO communication apparatus according to an exemplary embodiment of the present invention.

The stack structure of FIG. 2 includes a medium access control (MAC) layer 210, a base band layer 220, and a radio frequency (RF) layer 230.

Channel scanning for channel search can be carried out if the channel search is requested from either an upper layer of the MAC layer 210 or the MAC layer 210. Such channel scanning is classified into active scanning and passive scanning. In the case of active scanning, the MAC layer 210 can set a search frame for channel searching. For example, if the MIMO communication apparatus follows the IEEE 802.11 standard, the MAC layer 210 can set a probe request frame for active scanning.

Figure 3:
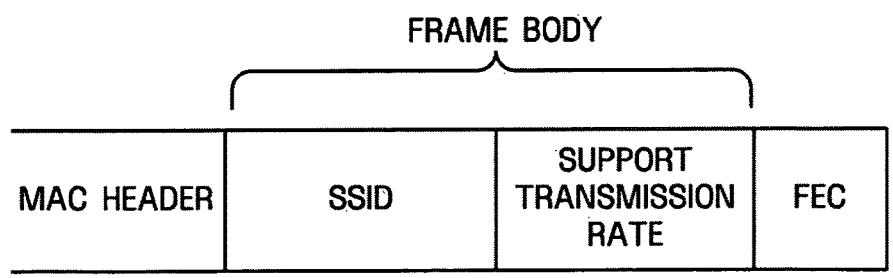
FIG. 3 is a view illustrating a probe request frame of the IEEE 802.11 standard.

The probe request frame of the IEEE 802.11 standard is shown in FIG. 3. The probe request frame includes two fields that set a service set ID (SSID) and a transmission rate supported by the MIMO communication apparatus.

A plurality of search frames are generated by the MAC layer 210, and the generated search frames are transmitted to the base band layer 220.

The base band layer 220 carries out signal processing (e.g., modulation and inverse fast Fourier transform, and other signal processing operations known in the art) for each search frame transmitted from the MAC layer 210.

The RF layer 230 outputs the search frames processed by the base band layer 220 through a plurality of antennas. The RF layer 230 outputs the plurality of search frames through the plurality of antennas., The RF layer 230 respectively assigns independent channels to the respective antennas so that the respective search frames can be output to their respective corresponding channels. Therefore, the MIMO communication apparatus according to an exemplary embodiment of the present invention carries out channel searching for independent channels using the plurality of antennas.

The channel to which the search frame is to be output can be determined by the MAC layer 210 or the base band layer 220.

If a response frame to the search frame is received from the communication apparatus that has received the search frame, the RF layer 230 transmits the received response frame to the base band layer 220.

The base band layer 220 carries out signal processing (for example, demodulation, fast Fourier transform, and other signal processing operations known in the art) for the response frame transmitted from the RF layer 230, and transmits the processed response frame to the MAC layer 210.

The MAC layer 210 acquires information on the status of the channel, to which the response frame is transmitted, through the response frame, and stores the acquired information. If the MIMO communication apparatus follows the IEEE 802.11 standard, the response frame may be a probe response frame, or other response frame known in the art.

Figure 4:
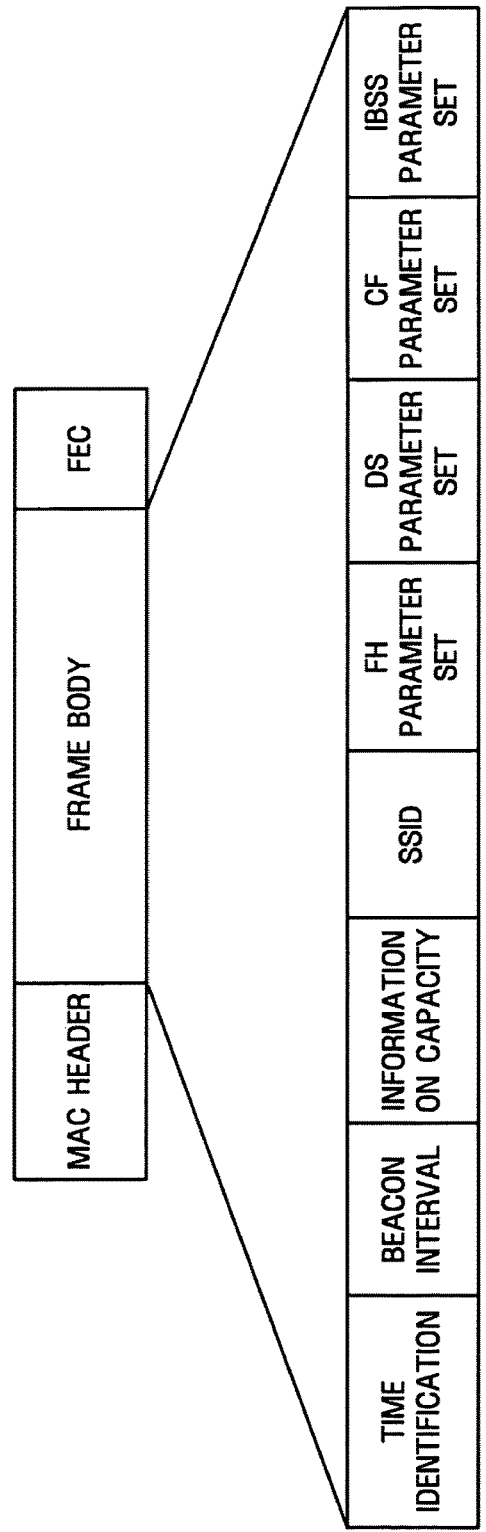
FIG. 4 is a view illustrating a probe response frame of the IEEE 802.11 standard.

The probe response frame of the IEEE 802.11 standard is shown in FIG. 4. The probe response frame can include all the parameters included in a beacon frame, such as an SSID, a frequency hopping (FH) parameter set, a direct sequence (DS) parameter set, a contention free (CF) parameter set, and an IBSS parameter set.

On the other hand, if the channel scanning is passive scanning, the MAC layer 210 is on standby to receive the beacon frame without generating the search frame. At this time, the MAC layer 210 controls the RF layer 230 so that the plurality of antennas respectively use their independent channels. Therefore, the RF layer 230 can receive beacon frames transmitted through the plurality of channels.

The received beacon frames are transmitted to the base band layer 220 to undergo a series of signal processing steps. Then, the processed beacon frames are transmitted to the MAC layer 210. Thus, the MAC layer 210 acquires information on the status of the channel, to which beacon frames are transmitted, through the beacon frames, and stores the information.

Hereinafter, the MIMO communication apparatus according to an exemplary embodiment of the present invention will be described with reference to FIG. 5.

Figure 5:
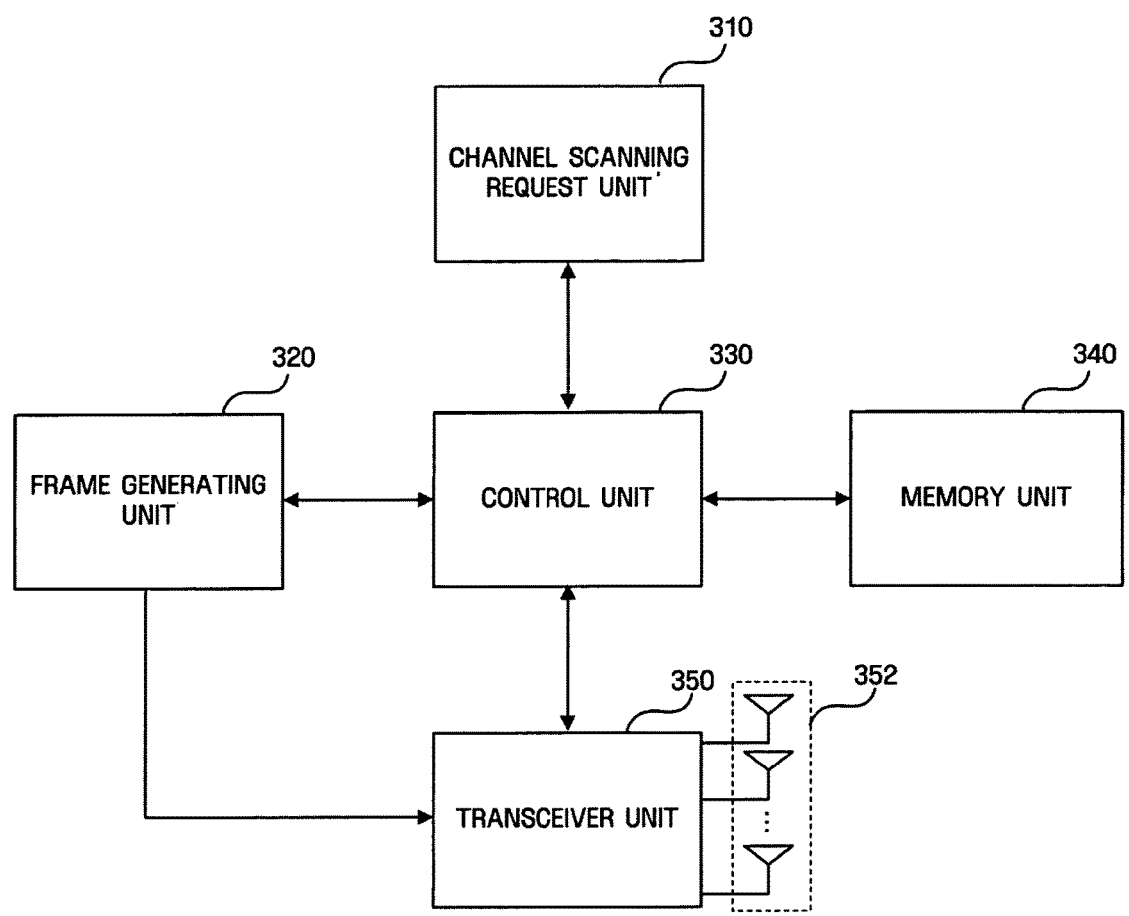
FIG. 5 is a block diagram illustrating the construction of a MIMO communication apparatus according to an exemplary embodiment of the present invention.

FIG. 5 is a block diagram illustrating the MIMO communication apparatus according to an exemplary embodiment of the present invention.

The MIMO communication apparatus includes a channel scanning request unit 310, a frame generating unit 320, a control unit 330, a memory unit 340, and a transceiver unit 350.

The channel scanning unit 310 sends a request for channel scanning to the control unit 330. At this time, the channel scanning unit 310 can transmit a list of channels to the control unit 330. The control unit 330 can carry out channel scanning for channels registered in this list.

The channel scanning may be requested regularly or irregularly, and it may be active scanning or passive scanning.

The frame generating unit 320 generates a search frame for channel scanning under the control of the control unit 330. The frame generating unit 320 may generate a plurality of search frames. If the MIMO communication apparatus according to an exemplary embodiment of the present invention follows the IEEE 802.11 standard, the search frame generated by the frame generating unit 320 may be the probe request frame shown in FIG. 3, or another search frame known in the art. This search frame is transmitted to the transceiver unit 350.

The control unit 330 controls the frame generating unit 320 and the transceiver unit 350 to carry out channel scanning in accordance with a request from the channel scanning request unit 310.

If the channel scanning request unit 310 requests active scanning, the control unit 330 controls the frame generating unit 320 to generate the search frame. The control unit 330 designates a channel over which the search frame is to be output, and transmits information on the channel to the transceiver unit 350.

If a response frame to the search frame is transmitted from a communication apparatus that has received the search frame and is thus received by the MIMO communications apparatus, the control unit 330 acquires information on the channel, over which the response frame is transmitted, through the response frame.

If there exists a channel among the channels that output the search frame, over which a reception event occurs, for example if either the response frame is not transmitted until after a threshold time elapses or the response frame is transmitted, and thus received by the MIMO communication apparatus, the control unit 330 designates a new channel to be switched to. At this time, the control unit 330 controls the frame generating unit 320 to generate a new search frame, and transmits to the transceiver unit 350 information on a new channel over which the new search frame is to be output. This operation is repeated until channel scanning for all channels is finished.

On the other hand, if the channel scanning request unit 310 requests passive scanning, the control unit 330 is put on standby to receive a beacon frame through the transceiver unit 350. The control unit 330 transmits information on a channel which is to receive the beacon frame to the transceiver unit 350. If the transceiver unit 350 receives the beacon frame, the control unit 330 can acquire information on the status of the channel, over which the beacon frame is transmitted, and thus received, through the beacon frame.

If there exists a channel among the channels designated to be on standby to receive the beacon frame, over which a response event occurs, for example a channel which did not receive the beacon frame before a threshold time elapses or which received the beacon frame, the control unit 330 designates a new channel to be switched to. The control unit 330 transmits to the transceiver unit 350 information on the new channel, and is on standby to receive the beacon frame via the new channel. This operation is repeated until channel scanning for all desired channels is finished.

If the transceiver unit 350 carries out SISO communication using one of the plurality of antennas 352, the control unit 330 can control the transceiver unit 350 to carry out channel scanning through the remaining antennas.

The memory unit 340 stores information on the channel status identified by the control unit 330 through the response frame or the beacon frame. Also, the memory unit 340 may store the list of channels to be searched for.

The transceiver unit 350 includes a plurality of antennas 352. In the case of active scanning, the transceiver unit 350 transmits the search frame generated by the frame generating unit 320 using the plurality of antennas 352 and receives a response frame to the search frame. Therefore, the transceiver unit 350 can transmit a plurality of search frames simultaneously. The transceiver unit 350 assigns independent channels to the respective antennas so that the plurality of search frames can be respectively output through their respective channels. The transceiver unit 350 can obtain the list of channels for outputting the search frame from the control unit 330.

If the control unit 330 carries out channel switching, the transceiver unit 350 switches a channel assigned to a specific antenna to a new channel under the control of the control unit 330. The transceiver unit 350 transmits the search frame or receives the response frame from the new channel through the corresponding antenna. The information on the new channel can be transmitted from the control unit 330 to the transceiver unit 350.

In the case of passive scanning, the transceiver unit 350 receives the beacon frame using the plurality of antennas 352. The transceiver unit 350 assigns independent channels to the respective antennas so that the plurality of antennas 352 can respectively receive the beacon frame. The transceiver unit 350 can obtain the list of channels for receiving the beacon frame from the control unit 330.

If the control unit 330 carries out channel switching, the transceiver unit 350 switches a channel assigned to a specific antenna to a new channel under the control of the control unit 330. The transceiver unit 350 receives the beacon frame from the new channel through the corresponding antenna. The information on the new channel can be transmitted from the control unit 330 to the transceiver unit 350.

Meanwhile, if the control unit 330 carries out channel scanning during SISO communication using one of the plurality of antennas 352, the transceiver unit 350 transmits the search frame or receives the beacon frame using the remaining antennas.

Hereinafter, the channel scanning procedure of the MIMO communication apparatus according to an exemplary embodiment of the present invention will be described with reference to FIG. 6.

Figure 6:
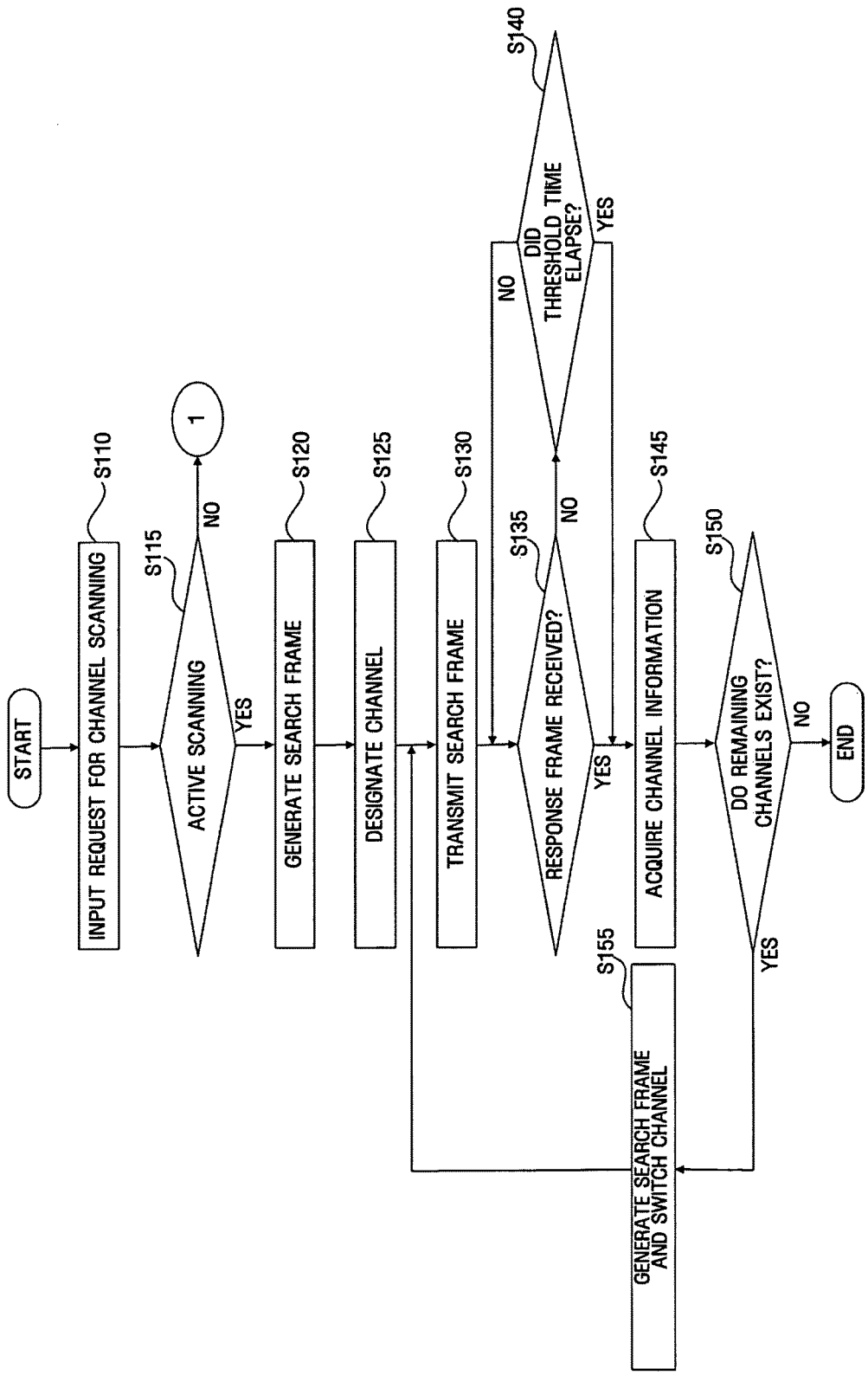
FIG. 6 is a flowchart illustrating the procedure of channel scanning according to an exemplary embodiment of the present invention.

FIG. 6 is a flowchart illustrating the channel scanning procedure of the MIMO communication apparatus according to an exemplary embodiment of the present invention.

If channel scanning is requested from the channel scanning request unit 310 (operation S110), the MIMO communication apparatus carries out scanning for the plurality of channels by independently using the plurality of antennas in accordance with the request for channel scanning.

If channel scanning is requested (operation S110), the control unit 330 determines whether the requested channel scanning is active scanning (operation S115).

If the requested channel scanning is active scanning, the frame generating unit 320 generates the search frame under the control of the control unit 330 (operation S120).

The control unit 330 designates a channel over which the search frame generated by the frame generating unit 320 is to be output (operation S125).

If information on the channel over which the search frame is to be output is transmitted from the control unit 330, the transceiver unit 350 assigns the channel designated by the control unit 330 to the plurality of antennas 352 and transmits the search frame to the antennas assigned with the channel (operation S130). At this time, the transceiver unit 350 respectively assigns independent channels to the respective antennas so that the plurality of antennas 352 transmit the search frames over the respective channels.

Also, if SISO communication is carried out using one of the plurality of antennas 352, the transceiver unit 350 can assign the channel to the remaining antennas and transmit the search frame through them.

If there exists a channel over which a response event occurs, for example a channel that received a response frame (operation S135) or that did not receive the response frame until after a threshold time elapses (operation S140), the control unit 330 acquires information on the status of the corresponding channel (operation S145), and may store it in the memory unit 340 (operation not shown).

Then, if the remaining channels for search exist (operation S150), the control unit 330 controls the frame generating unit 320 to generate a new search frame, and switches the channel, which received the response frame or which did not receive the response frame until after the threshold time elapsed, to a new channel (operation S155).

Thus, the transceiver unit 350 assigns the new channel designated by the control unit 330 to the antenna assigned the channel which received the response frame or which did not receive the response frame until after the threshold time elapsed, and transmits the search frame through the antenna assigned the new channel S130.

Such channel switching is carried out independently for each of the antennas 352.

Figure 7:
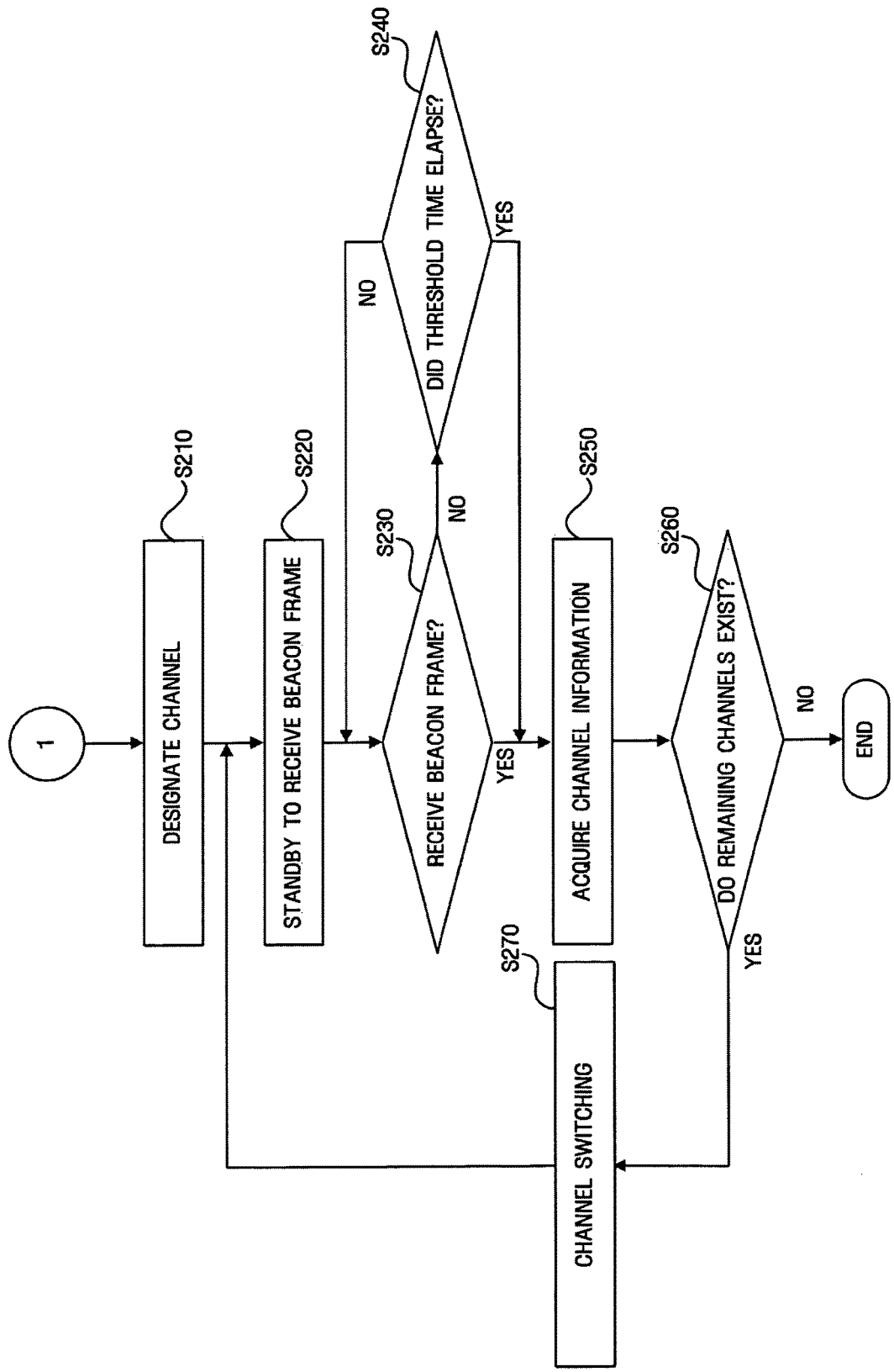
FIG. 7 is a flowchart illustrating passive scanning according to an exemplary embodiment of the present invention.

Passive scanning (requested by the channel scanning request unit 310) will now be described with reference to FIG. 7.

In case of passive scanning, the control unit 330 designates the channels that are to receive the beacon frame (operation S120), and is on standby to receive the beacon frame (operation S220).

The transceiver unit 350 assigns the channels designated by the control unit 330 to the plurality of antennas 352. The transceiver unit 350 assigns independent channels to the respective antennas so that the antennas 352 can respectively receive the beacon frames from independent channels.

Furthermore, if SISO communication is carried out using one of the plurality of antennas 352, the transceiver unit 350 can assign the channels to the remaining antennas and receive the beacon frame through them.

If there exists a channel among the channels assigned to the antennas 352, over which a response event occurs, for example if either the beacon frame is received (operation S230) or the beacon frame is not received until after a threshold time elapses (operation S240), the control unit 330 acquires information on the status of the corresponding channel (operation S250), and may store it in the memory unit 340.

If remaining channels to be searched exist (operation S260), the control unit 330 switches the channel, which received the beacon frame or which did not receive the beacon frame until after the threshold time elapsed, to a new channel (operation S270).

Thus, the transceiver unit 350 assigns the new channel designated by the control unit 330 to the antenna assigned the channel which received the beacon frame or which did not receive the beacon frame until after the threshold time elapsed, and the control unit 330 is on standby to receive the beacon frame through the antenna assigned the new channel (operation S220).

Such channel switching is carried out independently for each of the antennas 352.

Figure 8:
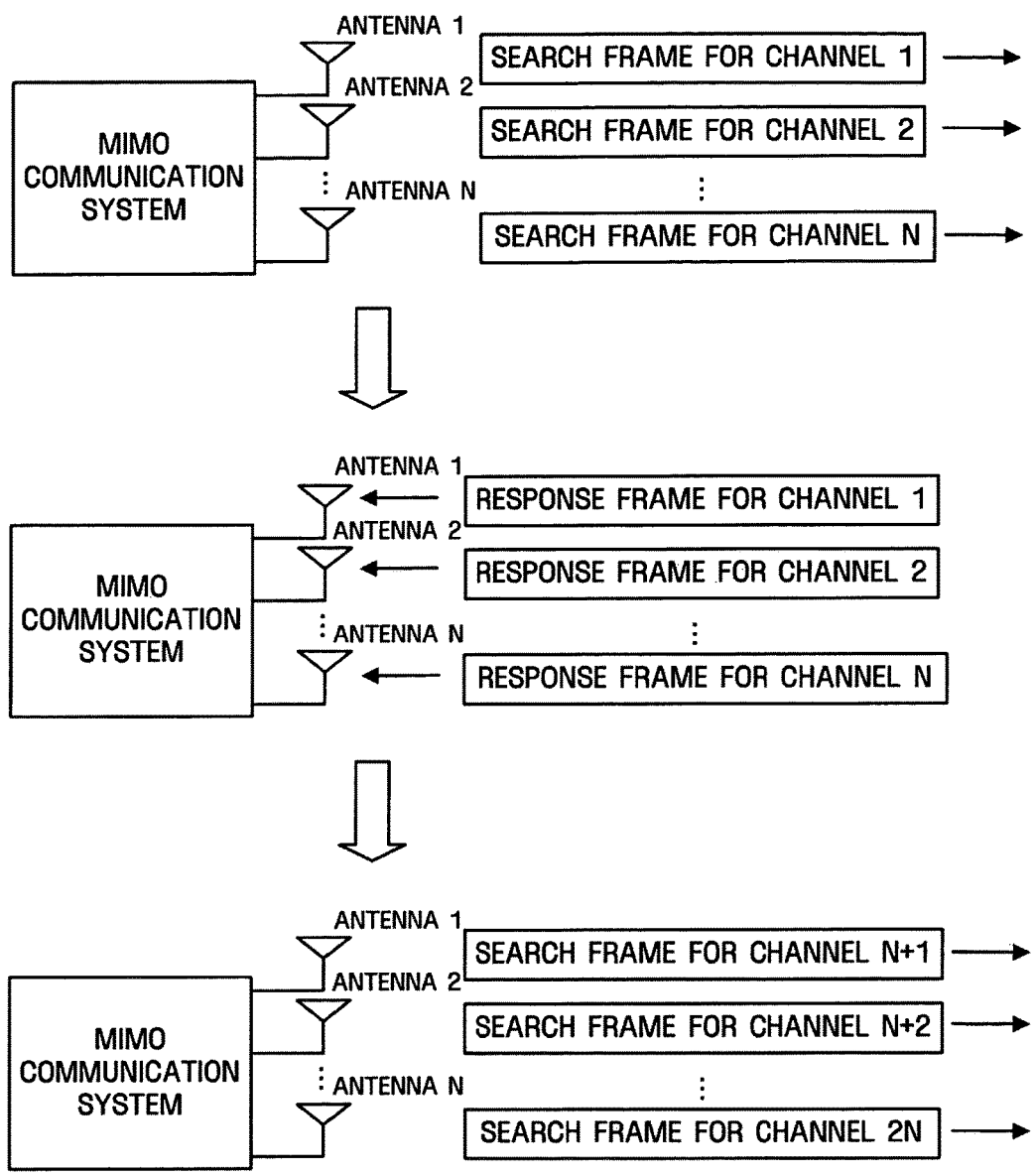
FIG. 8 is a view illustrating an example of channel scanning according to an exemplary embodiment of the present invention.

FIG. 8 illustrates an example of channel scanning of the MIMO communication apparatus according to an exemplary embodiment of the present invention.

As shown in FIG. 8, in the MIMO communication apparatus according to an exemplary embodiment of the present invention, the channel scanning is carried out in such a manner that the plurality of antennas are independently used to carry out switching of an independent channel per antenna.

Figure 9:
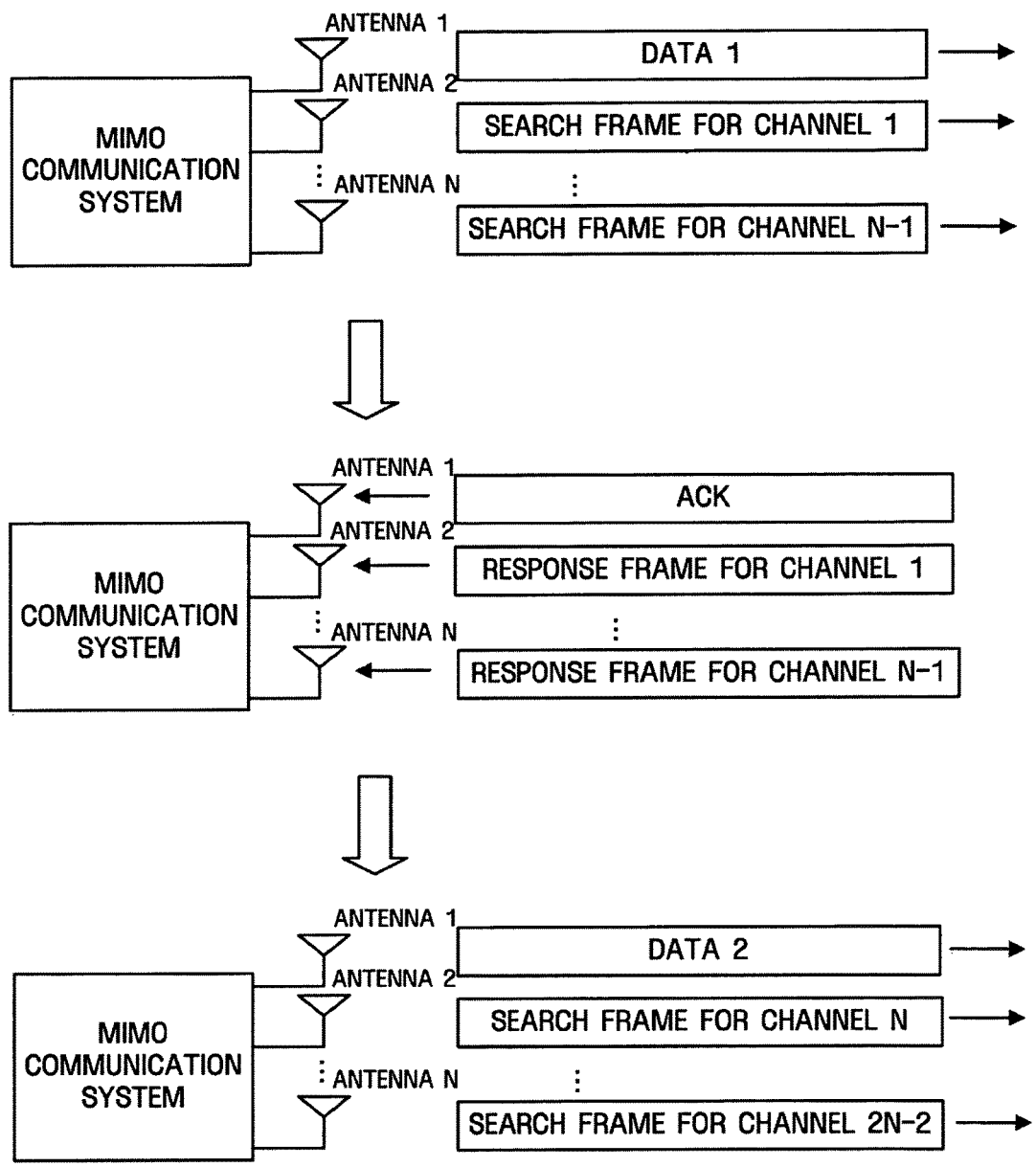
FIG. 9 is a view illustrating another example of channel scanning according to an exemplary embodiment of the present invention.

FIG. 9 illustrates another example of channel scanning of the MIMO communication apparatus according to an exemplary embodiment of the present invention.

As shown in FIG. 9, in the MIMO communication apparatus according to an exemplary embodiment of the present invention, SISO communication is carried out through one of the plurality of antennas while the channel scanning is carried out through the remaining antennas.

As described above, in the exemplary embodiments of the present invention, since scanning is simultaneously carried out for the plurality of channels, it is possible to reduce the channel scanning time of the MIMO communication apparatus Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method comprising:
   assigning a first antenna to scan a first channel and a second antenna to scan a second channel, among a plurality of antennas,
   wherein when a scanning is an active scanning, the method further comprises:
   generating a first search frame in order to scan the first channel and a second search frame in order to scan the second channel;
   scanning the first channel and the second channel by simultaneously transmitting the first search frame to the first channel and the second search frame to the second channel; and
   receiving at least one among a first response frame in response to the first search frame using the first antenna and a second response frame in response to the second search frame using the second antenna,
   wherein the first channel is individually scanned by transmitting the first search frame by the first antenna to the first channel, and the second channel is individually scanned by transmitting the second search frame by the second antenna to the second channel,
   wherein if there exists a channel, among the first channel and the second channel assigned to the first antenna and the second antenna, over which a reception event occurs,
   the scanning the first channel and the second channel further comprises:
   assigning a third channel to an antenna among the first antenna and the second antenna that is assigned to the channel over which the reception event occurred, wherein the reception event is receiving the at least one among the first response frame and the second response frame, and transmitting a new search frame through the antenna assigned to the third channel, wherein when the scanning is a passive scanning, the method further comprises:

waiting to receive a beacon frame through the first antenna and the second antenna, when there exists a channel among the first channel and the second channel assigned to the first antenna and the second antenna over which the reception event occurs, assigning the third channel to the antenna assigned to the channel over which the reception event occurred; and waiting to receive the beacon frame through the antenna assigned to the third channel, wherein the reception event is receiving the beacon frame or not receiving the beacon frame for a threshold time.

2. The method as claimed in claim 1, wherein if there exists an antenna, among the first antenna and the second antenna, which carries out single input single output (SISO) communication, the scanning the first channel and the second channel is performed by using at least one another antenna not carrying out the SISO communication, among the plurality of antennas.

3. The method as claimed in claim 1, wherein available channels of a network are determined as a search result of the scanning.

4. An apparatus comprising:

at least one processor configured to scan a first channel using a first antenna and to scan a second channel using a second antenna, among a plurality of antennas, wherein when a scanning is an active scanning:

the at least one processor is further configured to generate a first search frame in order to scan the first channel and a second search frame in order to scan the second channel, and to control a transceiver unit to transmit the first search frame and the second search frame simultaneously and receive at least one among a first response frame in response to the first search frame using the first antenna and a second response frame in response to the second search frame using the second antenna, wherein the first channel is individually scanned by transmitting the first search frame by the first antenna to the first channel, and the second channel is individually scanned by transmitting the second search frame by the second antenna to the second channel, wherein if there exists a channel among the first channel and the second channel assigned to the first antenna and the second antenna, over which a reception event occurs, the at least one processor is further configured to designate a third channel, to which the channel over which the reception event occurred is to be switched, and to control the transceiver unit to assign the third channel to the antenna which was assigned to the channel over which the reception event occurred and transmit a new search frame through the antenna assigned to the third channel, wherein the reception event is receiving the at least one among the first response frame and the second response frame, wherein when the scanning is a passive scanning:

the at least one processor is further configured to control the transceiver unit to wait to receive a beacon frame through the first antenna and the second antenna, when there exists a channel among the first channel and the second channel assigned to the first antenna and the second antenna over which the reception event occurs, the transceiver unit is further configured to assign the third channel to the antenna assigned to the channel over which the reception event occurred and wait to receive the beacon frame through the antenna assigned to the third channel, wherein the reception event is receiving the beacon frame or not receiving the beacon frame for a threshold time.

5. The apparatus as claimed in claim 4, wherein if there exists an antenna, among the first antenna and the second antenna, which carries out single input single output (SISO) communication, the at least one processor is further configured to scan the first channel and the second channel by using at least another antenna not carrying out the SISO communication, among the plurality of antennas.

6. The apparatus as claimed in claim 4, wherein available channels of a network are determined as a search result of the channel scanning.

* * * * *